US011955760B2

(12) United States Patent
Tsuji et al.

(10) Patent No.: US 11,955,760 B2
(45) Date of Patent: Apr. 9, 2024

(54) TERMINAL BLOCK

(71) Applicant: OMRON Corporation, Kyoto (JP)

(72) Inventors: Shinya Tsuji, Kyoto (JP); Kenichiro Masaki, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 388 days.

(21) Appl. No.: 17/437,584

(22) PCT Filed: Feb. 19, 2020

(86) PCT No.: PCT/JP2020/006570
§ 371 (c)(1),
(2) Date: Sep. 9, 2021

(87) PCT Pub. No.: WO2020/189164
PCT Pub. Date: Sep. 24, 2020

(65) Prior Publication Data

US 2022/0158370 A1 May 19, 2022

(30) Foreign Application Priority Data

Mar. 15, 2019 (JP) ................................ 2019-048194

(51) Int. Cl.
*H01R 9/26* (2006.01)
*H01H 50/14* (2006.01)
*H01R 9/24* (2006.01)

(52) U.S. Cl.
CPC ........... *H01R 9/2625* (2013.01); *H01H 50/14* (2013.01); *H01R 9/24* (2013.01); *H01R 9/2491* (2013.01)

(58) Field of Classification Search
CPC ...... H01R 9/2625; H01R 9/24; H01R 9/2425; H01R 9/2433; H01R 9/2458; H01H 50/14
See application file for complete search history.

(56) References Cited

U.S. PATENT DOCUMENTS 6,811,416 B2 * 11/2004 Yano .................. H01R 13/6335 439/157
7,658,653 B2 * 2/2010 Diekmann ........... H01R 9/2633 439/715

FOREIGN PATENT DOCUMENTS

JP S54179447 U 12/1979
JP S6088446 U 6/1985
(Continued)

OTHER PUBLICATIONS

Written Opinion of the International Searching Authority for International Application No. PCT/JP2020/006570; dated May 18, 2020.
(Continued)

*Primary Examiner* — Oscar C Jimenez
*Assistant Examiner* — Paul D Baillargeon
(74) *Attorney, Agent, or Firm* — CANTOR COLBURN LLP

(57) ABSTRACT

A terminal block includes a housing including a connection surface to which an electromagnetic relay is connectable. The housing includes at least one attachment groove that opens to the connection surface and extends toward inside of the housing. The at least one attachment groove includes a first groove portion and a second groove portion are disposed adjacent to and communicating with each other. The first groove portion includes a first narrow width portion disposed near the connection surface, a wide width portion disposed farther from the connection surface than the first narrow width portion, and a step portion at a boundary of the first narrow width portion and the wide width portion, the step portion being capable of restricting a movement of the holding member in a removal direction. The second groove portion is configured to be capable of accommodating the claw portion without elastically deforming.

8 Claims, 6 Drawing Sheets

(56) References Cited

FOREIGN PATENT DOCUMENTS

| | | | |
|---|---|---|---|
| JP | S6090886 | U | 6/1985 |
| JP | H032285 | A | 1/1991 |
| JP | H07130439 | A | 5/1995 |
| JP | 2007323897 | A | 12/2007 |

OTHER PUBLICATIONS

International Search Report for International Application No. PCT/JP2020/006570; dated May 18, 2020.

* cited by examiner

TERMINAL BLOCK

CROSS REFERENCE TO RELATED APPLICATIONS

This is the U.S. national stage of application No. PCT/JP2020/006570, filed on Feb. 19, 2020. Priority under 35 U.S.C. § 119(a) and 35 U.S.C. § 365(b) is claimed from Japanese Application No. 2019-048194, filed Mar. 15, 2019, the disclosure of which is also incorporated herein by reference.

TECHNICAL FIELD

The present disclosure relates to, for example, a terminal block to which an electromagnetic relay can be connected.

BACKGROUND ART

PTL 1 discloses a relay socket having a substantially rectangular parallelepiped shape. The relay socket is configured such that a relay can be connected to an upper surface of the relay socket. In the relay connected to the relay socket, a movement in a direction orthogonal to an upper surface of the relay socket is restricted by a plate-like holding member having one end attached to a side surface of the relay socket, and a connected state between the relay socket and the relay is held.

CITATION LIST

Patent Literature

PTL 1: JP 2007-323897 A

SUMMARY OF INVENTION

Technical Problem

With diversification of relay sockets in recent years, an attaching position of the holding member is limited, and one end of the holding member may not be able to be attached to the side surface of the relay socket.

An object of the present disclosure is to provide a terminal block in which a holding member is attachable to and detachable from a connecting surface of a housing.

Solution to Problem

A terminal block includes a housing including a connection surface to which an electromagnetic relay is connectable and a holding member is attachable, the holding member that holds the electromagnetic relay in a state of being connected to the connection surface, including:

- a main body portion having an elongated plate shape;
- an arm portion at a first end of the main body portion in an extending direction, the arm portion extending in a direction intersecting a plate surface of the main body portion; and
- a claw portion at a second end on a side opposite to the first end of the main body portion in the extending direction, the claw portion extending in a direction away from the main body portion from the second end toward the first end and being elastically deformable in a direction approaching the main body portion, wherein the housing includes at least one attachment groove that opens to the connection surface and extends toward inside of the housing along a first direction intersecting the connection surface, the at least one attachment groove includes a first groove portion and a second groove portion respectively capable of accommodating the second end of the main body portion in a state where the main body portion extends in the first direction and the arm portion extends in a second direction intersecting the first direction and the plate surface of the main body portion so that the connected electromagnetic relay can be sandwiched together with the connection surface, the first groove portion and the second groove portion being disposed adjacent to and communicating with each other in a third direction intersecting the first direction and the second direction;

the first groove portion includes:

a first narrow width portion disposed near the connection surface in the first direction, the first narrow width portion being capable of accommodating the claw portion in an elastically deformed state;

a wide width portion disposed farther from the connection surface than the first narrow width portion in the first direction, the wide width portion being capable of accommodating the claw portion without elastically deforming; and a step portion at a boundary of the first narrow width portion and the wide width portion, the step portion coming into contact with an end on the first end side of the claw portion accommodated in the wide width portion to be capable of restricting a movement of the holding member in a removal direction that is the first direction from the inside of the housing toward the outside of the housing, and the second groove portion is configured to be capable of accommodating the claw portion without elastically deforming and capable of releasing a restriction of the movement of the holding member in the removal direction by the step portion when the holding member accommodated in the first groove portion moves to the second groove portion.

Advantageous Effects of Invention

According to the terminal block, the housing includes the attachment groove that opens to the connection surface and extends toward the inside of the housing. The attachment groove includes the first groove portion and the second groove portion that are disposed adjacent to and communicate with each other in the third direction. Each of the first groove portion and the second groove portion is configured to be capable of accommodating the second end of the main body portion in a state where the main body portion extends in the first direction and the arm portion extends in the second direction so that the connected electromagnetic relay can be sandwiched together with the connection surface. The first groove portion includes a first narrow width portion that is disposed near the connection surface and can accommodate the claw portion in an elastically deformed state, a wide width portion that is disposed farther from the connection surface than the first narrow width portion and can accommodate the claw portion without elastically deforming, and a step portion that is at a boundary of the first narrow width portion and the wide width portion and can restrict a movement of the holding member. The second groove portion is configured to be capable of accommodating the claw portion without elastically deforming and capable of releasing the restriction of the movement by the step portion when the holding member accommodated in the first groove portion moves to the second groove portion. According to such a configuration, the terminal block in which the holding member can be attached to and detached from the connection surface of the housing can be realized.

DESCRIPTION OF EMBODIMENTS

Hereinafter, an example of the present disclosure will be described with reference to the accompanying drawings. In the following description, terms (for example, terms including "up", "down", "right", and "left") indicating specific directions or positions are used as necessary, but the use of these terms is to facilitate the understanding of the present disclosure with reference to the drawings, and the technical scope of the present disclosure is not to be limited by the meaning of these terms. In addition, the following description is merely illustrative in nature, and is not intended to limit the present disclosure, its application, or its use. Furthermore, the drawings are schematic, and ratios of dimensions and the like do not necessarily match the actual ones.

Figure 1:
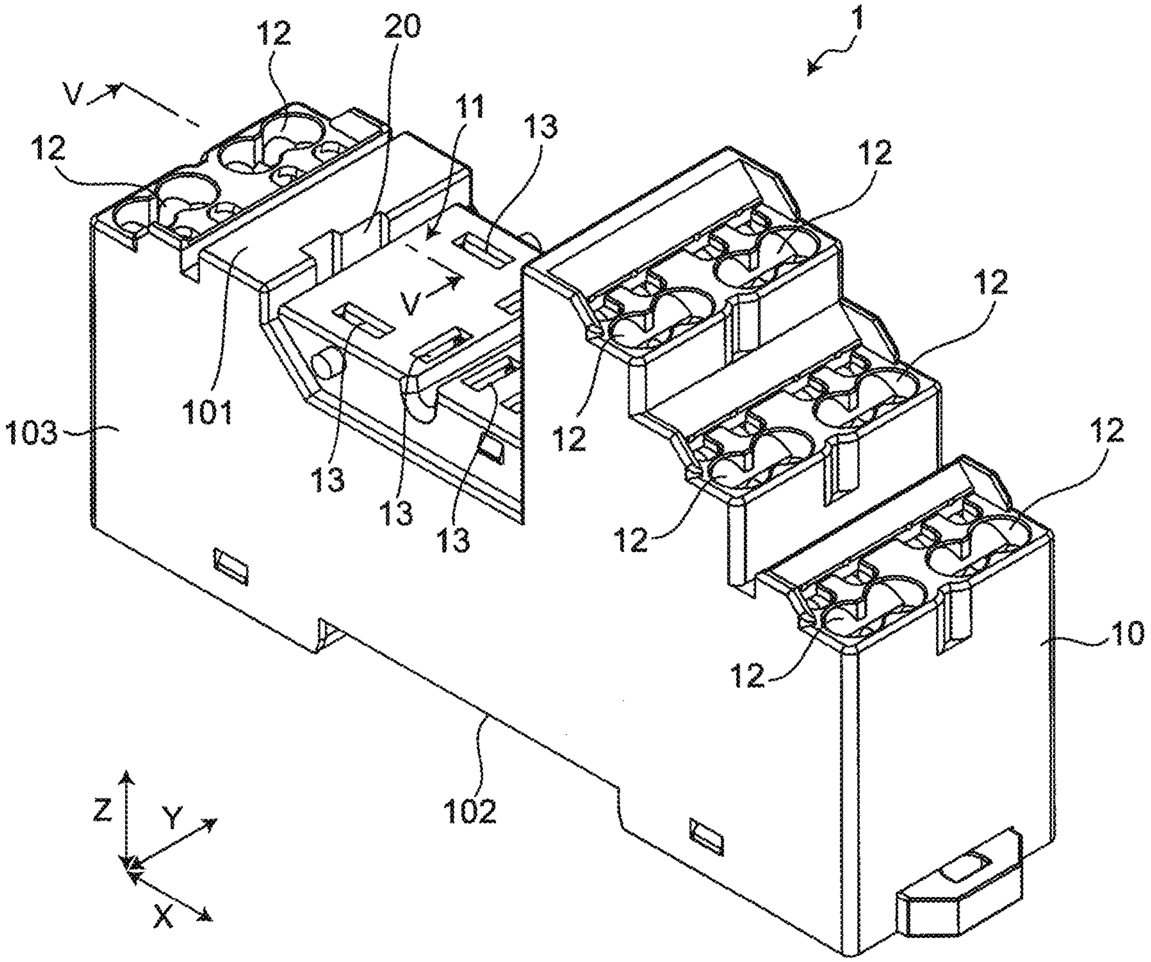
FIG. 1 is a perspective view illustrating a terminal block according to one embodiment of the present disclosure.

As illustrated in FIG. 1, a terminal block 1 according to one embodiment of the present disclosure includes a housing 10 having an insulating property. As an example, the housing 10 has a substantially rectangular parallelepiped box shape, and accommodates a plurality of connection terminals (not illustrated) therein. One of a pair of substantially rectangular surfaces intersecting a height direction Z of the housing 10 (that is, an upper surface 101 of the housing 10 in FIG. 1) is provided with a connection surface 11 and a plurality of openings 12. The connection surface 11 is disposed substantially at the center of the upper surface 101 of the housing 10 in a longitudinal direction. Each opening 12 is disposed on both sides of the connection surface 11 in a longitudinal direction X of the upper surface of the housing 10. When an external wiring is inserted into the housing 10 via each opening 12, each connection terminal inside the housing 10 and the external wiring are electrically connect.

The other of the pair of substantially rectangular surfaces intersecting the height direction Z of the housing 10 (that is, a bottom surface 102 of the housing 10 in FIG. 1) is configured to be able to hold, for example, a DIN rail standardized by German Industry Standard (DIN).

The connection surface 11 is provided with a plurality of terminal holes 13 and an attachment groove 20. Each of the terminal holes 13 is configured to allow a terminal of an electromagnetic relay 100 (see FIG. 2) to be inserted therein. When the terminals of the electromagnetic relay 100 is inserted into the housing 10 through each of the terminal holes 13, each of the connection terminals inside the housing 10 and the terminals of the electromagnetic relay 100 are electrically connected. The attachment groove 20 is configured such that a holding member 300 (see FIG. 2) that holds the electromagnetic relay 100 connected to the housing 10 can be attached to and detached from the connection surface 11.

Figure 3:
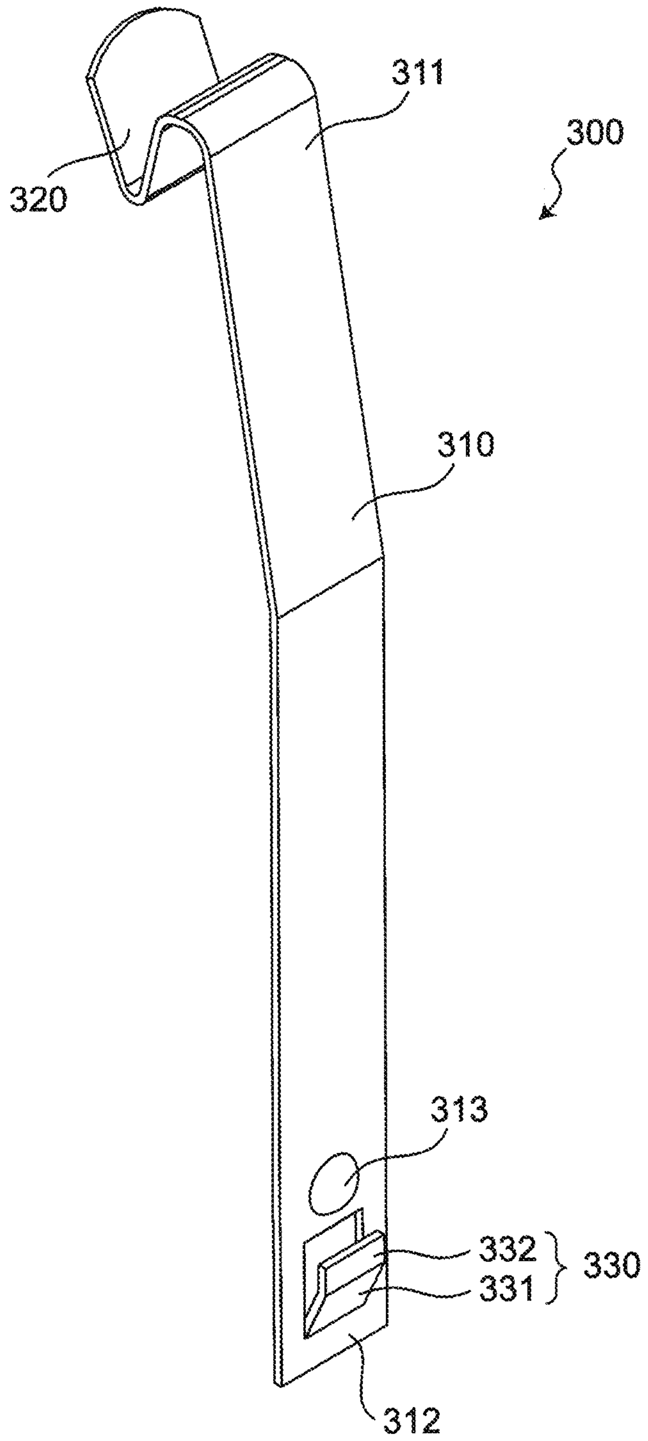
FIG. 3 is a perspective view illustrating a holding member attached to the terminal block of FIG. 1.

Here, the holding member 300 will be described. As illustrated in FIG. 3, the holding member 300 includes a main body portion 310 having an elongated plate shape, an arm portion 320 provided at a first end 311 of the main body portion 310 in an extending direction thereof, and a claw portion 330 provided at a second end 312 opposite to the first end 311 of the main body portion 310 in the extending direction thereof.

As illustrated in FIG. 3, the second end 312 of the main body portion 310 is provided with a press-fit protrusion 313 projecting out in a direction away from the plate surface. By the press-fit protrusion 313, the second end 312 of the main body portion 310 is accommodated in a first groove portion 21 of the attachment groove 20, described later, by press-fitting.

As illustrated in FIG. 3, the claw portion 330 is provided on a plate surface of the second end 312 of the main body portion 310. The claw portion 330 extends in a direction away from the main body portion 310 from the second end 312 toward the first end 311. The claw portion 330 is configured to be elastically deformable in a direction approaching the main body portion 310. Specifically, the claw portion 330 is configured by an inclined portion 331 and a flat plate portion 332. The inclined portion 331 extends in a direction away from the main body portion 310 from the second end 312 toward the first end 311. The flat plate portion 332 extends along the plate surface of the main body portion 310 from an end of the inclined portion 331 closer to the first end 311 of the main body portion 310 in a first direction Z toward the first end 311 of the main body portion 310.

The components of the holding member 300 accommodated in the attachment groove 20 are arranged as follows.

Figure 2:
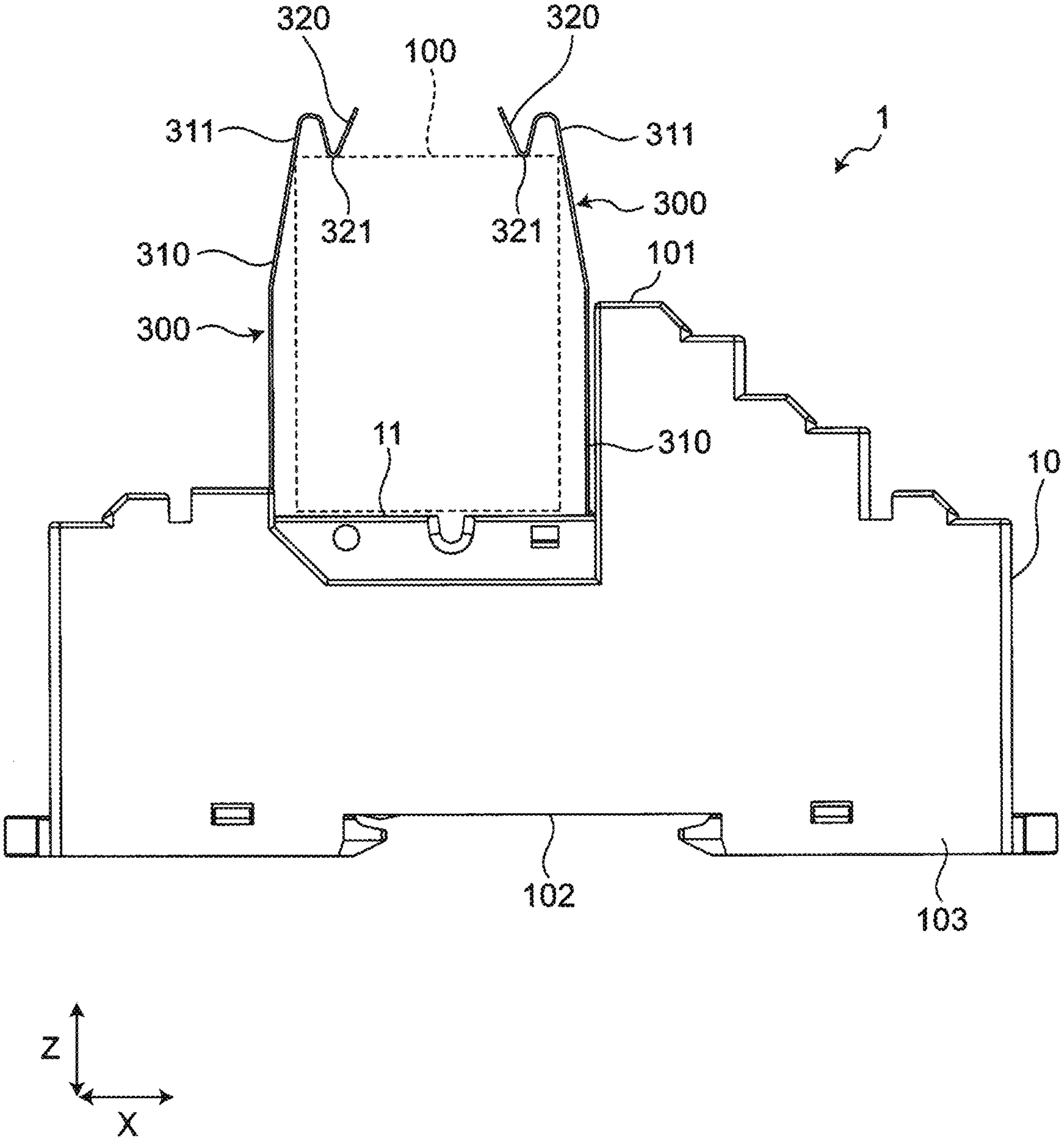
FIG. 2 is a side view of the terminal block of FIG. 1.

As illustrated in FIG. 2, the main body portion 310 extends in a first direction (that is, the height direction Z of the housing 10) intersecting (for example, orthogonal) the connection surface 11.

As illustrated in FIG. 2, the arm portion 320 is provided at the first end 311 of the main body portion 310, and extends in a second direction intersecting the first direction Z and the plate surface of the main body portion 310 (that is, the longitudinal direction X of the upper surface 101 of the housing 10). Specifically, the arm portion 320 includes a projection 321 projecting out from the first end 311 toward the second end 312 of the main body portion 310. The arm portion 320 is configured such that the projection 321 comes into contact with the electromagnetic relay 100 connected to the connection surface 11. That is, the electromagnetic relay 100 connected to the connection surface 11 is sandwiched and held between the connection surface 11 and the projection 321 of the arm portion 320 in the first direction Z.

Figure 4:
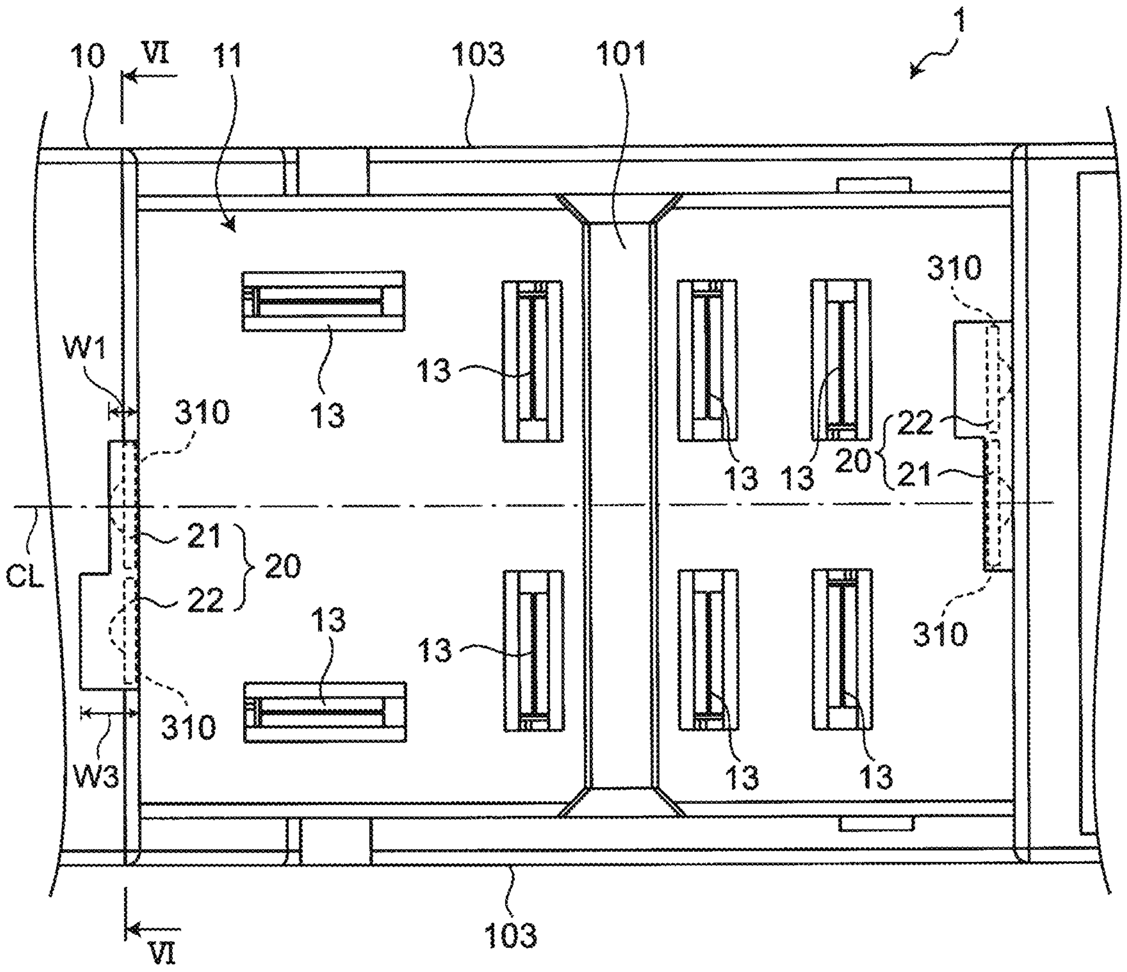
FIG. 4 is an enlarged top view of the terminal block of FIG. 1.

As illustrated in FIG. 4, the attachment groove 20 opens to the connection surface 11 and extends toward the inside of the housing 10 along the first direction Z. The attachment groove 20 includes a first groove portion 21 and a second groove portion 22 that are disposed adjacent to and communicate with each other in the short-side direction Y of the upper surface 101 of the housing 10. Each of the first groove portion 21 and the second groove portion 22 is configured to be capable of accommodating one end in the longitudinal direction of the holding member 300.

Figure 5:
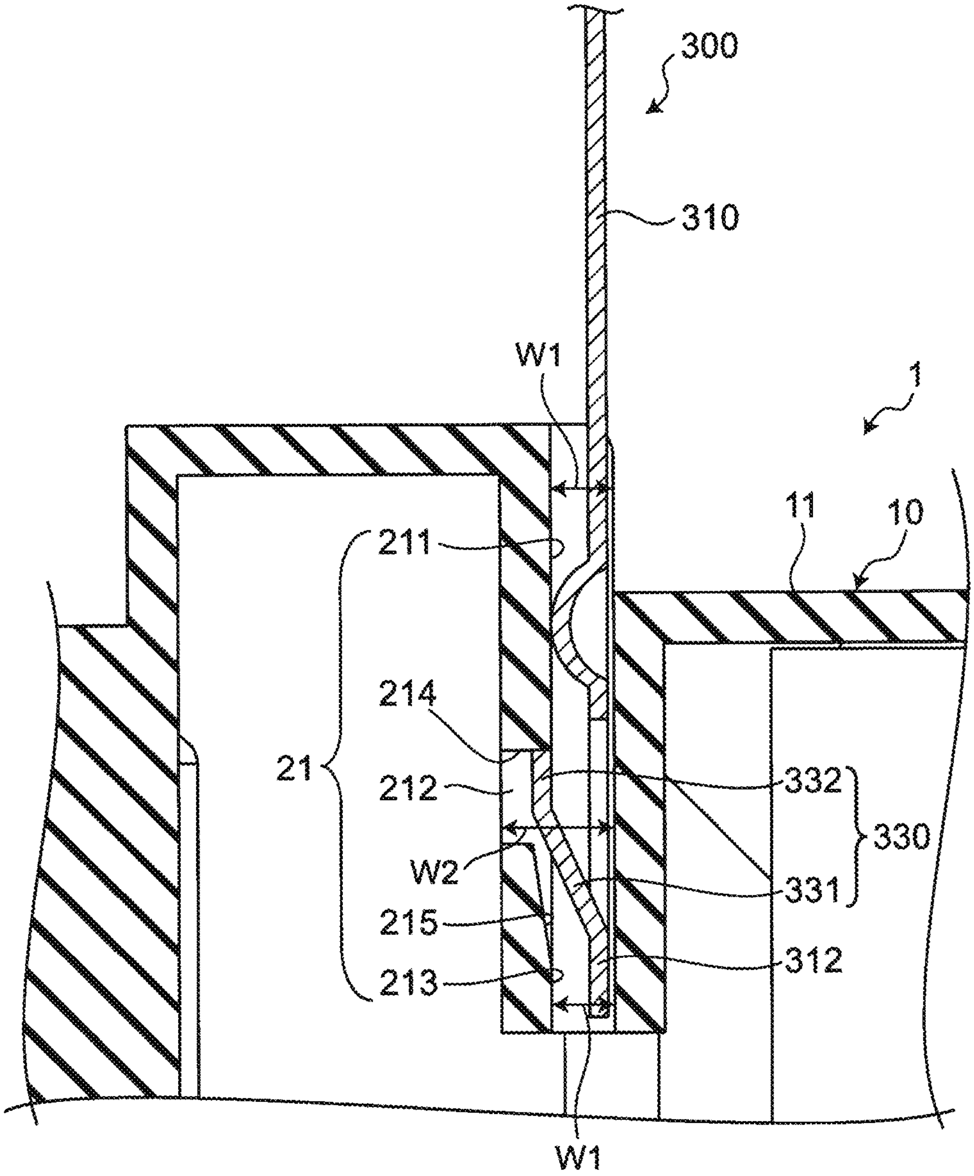
FIG. 5 is a cross-sectional view taken along line V-V of FIG. 1.

As illustrated in FIG. 5, the first groove portion 21 includes a first narrow width portion 211, a wide width portion 212, and a second narrow width portion 213 arranged in series along the first direction Z. The first narrow width portion 211 is disposed near the connection surface 11 in the first direction Z. The wide width portion 212 is disposed farther from the connection surface 11 than the first narrow width portion 211 in the first direction Z. The second narrow width portion 213 is disposed farther from the connection surface 11 than the wide width portion 212 in the first direction Z. Each of the first narrow width portion 211 and the second narrow width portion 213 has a groove width W1 (that is, the groove dimension in the second direction X) capable of accommodating the second end 312 of the main body portion 310 in a state where the claw portion 330 is elastically deformed. The wide width portion 212 has a groove width W2 capable of accommodating the second end 312 of the main body portion 310 without elastically deforming the claw portion 330.

A step portion 214 is provided at a boundary of the first narrow width portion 211 and the wide width portion 212. The step portion 214 is configured such that a tip of the claw portion 330, which is accommodated in the wide width portion 212 and not elastically deformed, on the first end 311 side of the main body portion 310 (that is, a tip of the flat plate portion 332 in the first direction Z) comes into contact the step portion 214. This restricts a movement of the holding member 300 in a removal direction that is the first direction Z from the inside of the housing 10 toward the outside of the housing 10 (that is, the upward direction in FIG. 5).

An inclined portion 215 is provided between the wide width portion 212 and the second narrow width portion 213. The inclined portion 215 is inclined such that a groove dimension in the second direction X decreases as a distance from the connection surface 11 increases. The inclined portion 215 facilitates elastic deformation when the claw portion 330 moves from the wide width portion 212 to the second narrow width portion 213.

As illustrated in FIG. 4, the second groove portion 22 has a groove width W3 capable of accommodating without elastically deforming the claw portion. When the holding member 300 accommodated in the first groove portion 21 moves to the second groove portion 22, the restriction on the movement of the holding member 300 in the removal direction by the step portion 214 is released.

Figure 6:
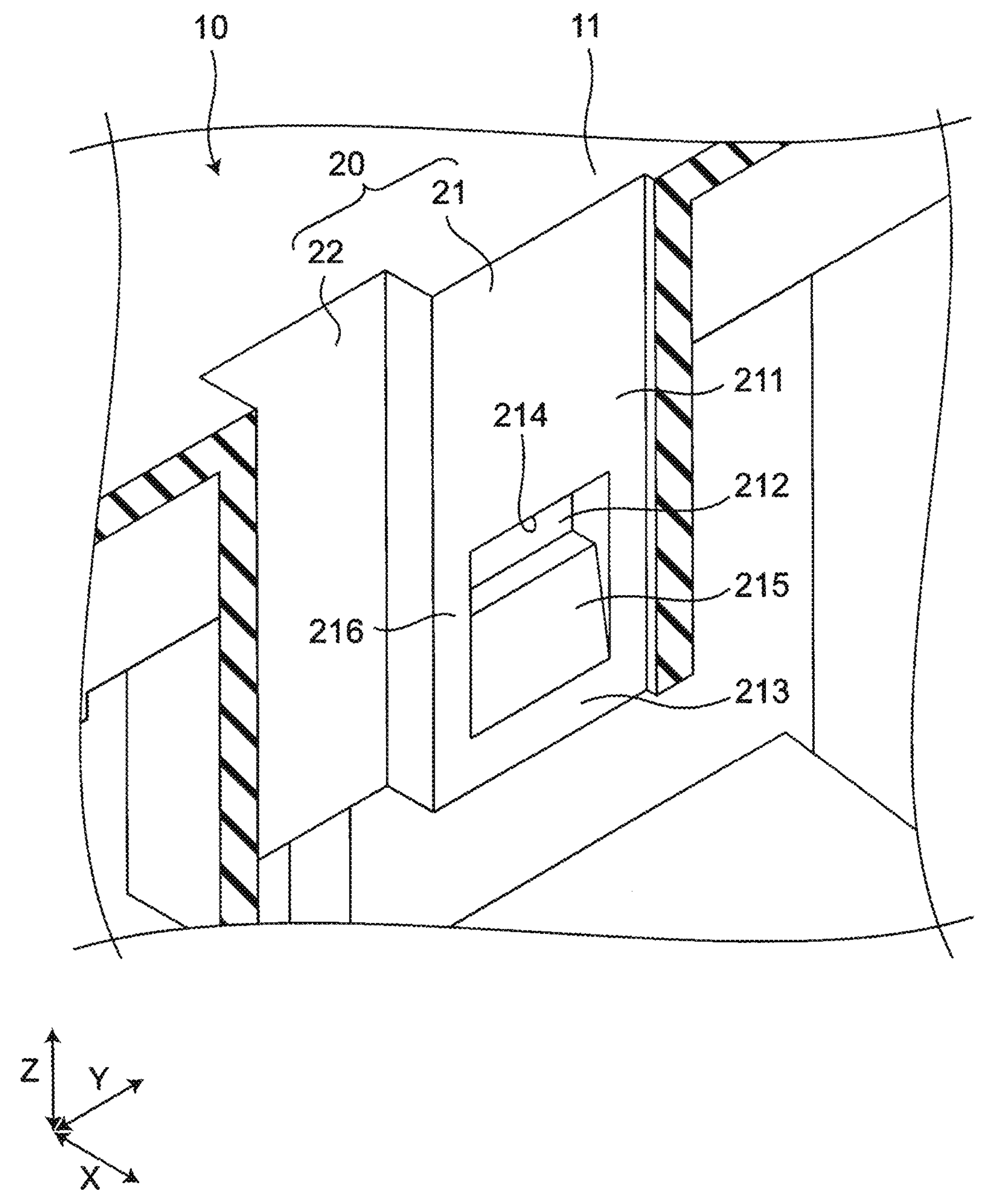
FIG. 6 is a cross-sectional view taken along line VI-VI of FIG. 4.

As illustrated in FIG. 6, a wall portion 216 is provided at a boundary of the wide width portion 212 and the second groove portion 22 in a third direction intersecting (for example, orthogonal) the first direction Z and the second direction X (that is, the short-side direction Y of the upper surface 101 of the housing 10). The wall portion 216 restricts a movement of the claw portion 330 accommodated in the wide width portion 212 in the third direction Y. The wall portion 216 extends from the step portion 214 to the second narrow width portion 213 through the wide width portion 212 and the inclined portion 215 in the first direction Z. When the claw portion 330 is located at the wide width portion 212 and the inclined portion 215, the holding member 300 cannot be moved to the second groove portion 22 by the wall portion 216, however, when the claw portion 330 is located at the second narrow width portion 213, the holding member 300 can be moved to the second groove portion 22.

When the holding member 300 is attached to the connection surface 11 of the housing 10, the holding member 300 is inserted into the first groove portion 21 of the attachment groove 20 from the second end 312 side, and is moved along an insertion direction that is the first direction Z from the outside of the housing 10 toward the inside of the housing 10. At this time, the holding member 300 is moved until the claw portion 330 is located at the wide width portion 212. When the claw portion 330 is arranged at the wide width portion 212, the movement of the holding member 300 in the removal direction is restricted by the step portion 214, and the movement of the holding member 300 in the third direction Y is restricted by the wall portion 216.

When the holding member 300 attached to the connection surface 11 of the housing 10 is detached, the holding member 300 is further moved along the insertion direction until the claw portion 330 passes through the inclined portion 215 and is located at the second narrow width portion 213. When the claw portion 330 reaches the second narrow width portion 213, the restriction on the movement of the holding member 300 in the third direction Y by the wall portion 216 is released, and the holding member 300 can be moved toward the second groove portion 22. When the holding member 300 moves to the second groove portion 22, the restriction on the movement of the holding member 300 in the removal direction by the step portion 214 is released.

According to the terminal block 1, the housing 10 includes the attachment groove 20 that opens to the connection surface 11 and extends toward the inside of the housing 10. The attachment groove 20 includes the first groove portion 21 and the second groove portion 22 that are disposed adjacent to and communicate with each other in the third direction Y. Each of the first groove portion 21 and the second groove portion 22 is configured to be capable of accommodating the second end 312 of the main body portion 310 in a state where the main body portion 310 of the holding member 300 extends in the first direction Z and the arm portion 320 extends in the second direction X so that the connected electromagnetic relay 100 can be sandwiched together with the connection surface 11. The first groove portion 21 includes the first narrow width portion 211 that is disposed near the connection surface 11 and can accommodate the claw portion 330 of the holding member 300 in an elastically deformed state, the wide width portion 212 that is disposed farther from the connection surface 11 than the first narrow width portion 211 and can accommodate the claw portion 330 without elastically deforming, and the step portion 214 that is provided at a boundary of the first narrow width portion 211 and the wide width portion 212 and can restrict a movement of the holding member 300. The second groove portion 22 is configured to be capable of accommodating the claw portion 330 without elastically deforming and capable of releasing the restriction of the movement by the step portion 214 when the holding member 300 accommodated in the first groove portion 21 moves to the second groove portion 22. With such a configuration, the terminal block 1 in which the holding member 300 can be attached to and detached from the connection surface 11 of the housing 10 can be realized.

The first groove portion 21 further includes the second narrow width portion 213 that is disposed farther from the connection surface 11 than the wide width portion 212 and can accommodate the second end 312 of the holding member 300 in a state where the claw portion 330 is elastically deformed. The wall portion 216 that restricts the movement of the accommodated claw portion 330 is provided at a boundary of the wide width portion 212 and the second groove portion 22. The holding member 300 accommodated in the first groove portion 21 moves to the second groove portion 22 when the claw portion 330 moves from the wide width portion 212 to the second narrow width portion 213. With such a configuration, the terminal block 1 in which the holding member 300 can be more reliably attached to the connection surface 11 of the housing 10 can be realized.

As illustrated in FIG. 2, in the terminal block 1, as an example, the connection surface 11 is provided with a pair of attachment grooves 20 arranged at intervals in the second direction X, and each terminal hole 13 is arranged between the pair of attachment grooves 20. In a plan view as viewed from the first direction Z, each of the attachment grooves 20 is disposed such that a center line CL, which passes through the a center of the pair of side surfaces 103 of the housing 10 and extends in the second direction X, passes through the center of the first groove portion 21 of each of the attachment grooves 20 in the third direction Y. With such a configuration, the terminal block 1 that can more reliably hold the electromagnetic relay 100 connected to the housing 10 by the holding member 300 can be realized.

The first groove portion 21 merely needs to have the first narrow width portion 211, the wide width portion 212, and the step portion 214. The second narrow width portion 213 and the wall portion 216 may be omitted. In the terminal block 1, the first groove portion 21 is not provided with a bottom surface, but may be provided with a bottom surface.

The holding member may be accommodated in the attachment groove 20 to hold the electromagnetic relay 100 connected to the housing 10. As the holding member, for example, a holding member 300 in which the press-fit protrusion 313 is omitted from the second end 312 of the main body portion 310 may be used, or a pair of holding members 300 in which the arm portions 320 are connected to each other may be used.

Various embodiments of the present disclosure have been described above in detail with reference to the drawings, and lastly, various aspects of the present disclosure will be described. In the following description, reference numerals are also added as an example.

A terminal block 1 of a first aspect of the present disclosure includes, a housing 10 including a connection surface 11 to which an electromagnetic relay 100 is connectable and a holding member 300 is attachable, the holding member 300 that holds the electromagnetic relay 100 in a state of being connected to the connection surface 11, including:

- a main body portion 310 having an elongated plate shape;
- an arm portion 320 at a first end 311 of the main body portion 310 in an extending direction, the arm portion 320 extending in a direction intersecting a plate surface of the main body portion 310; and
- a claw portion 330 at a second end 312 on a side opposite to the first end 311 of the main body portion 310 in the extending direction, the claw portion 330 extending in a direction away from the main body portion 310 from the second end 312 toward the first end 311 and being elastically deformable in a direction approaching the main body portion 310, wherein the housing 10 includes at least one attachment groove 20 that opens to the connection surface 11 and extends toward inside of the housing 10 along a first direction Z intersecting the connection surface 11, the at least one attachment groove 20 includes a first groove portion 21 and a second groove portion 22 respectively capable of accommodating the second end 312 of the main body portion 310 in a state where the main body portion 310 extends in the first direction Z and the arm portion 320 extends in a second direction X intersecting the first direction Z and the plate surface of the main body portion 310 so that the connected electromagnetic relay 100 can be sandwiched together with the connection surface 11, the first groove portion 21 and the second groove portion 22 being disposed adjacent to and communicating with each other in a third direction Y intersecting the first direction Z and the second direction X, the first groove portion includes:

a first narrow width portion 211 disposed near the connection surface 11 in the first direction Z, the first narrow width portion 211 being capable of accommodating the claw portion 330 in an elastically deformed state;

a wide width portion 212 disposed farther from the connection surface 11 than the first narrow width portion 211 in the first direction Z, the wide width portion 212 being capable of accommodating the claw portion 330 without elastically deforming; and a step portion 214 at a boundary of the first narrow width portion 211 and the wide width portion 212, the step portion 214 coming into contact with an end on the first end 311 side of the claw portion 330 accommodated in the wide width portion to be capable of restricting a movement of the holding member 300 in a removal direction that is the first direction Z from the inside of the housing 10 toward the outside of the housing 10, and the second groove portion 22 is configured to be capable of accommodating the claw portion 330 without elastically deforming and capable of releasing a restriction of the movement of the holding member 300 in the removal direction by the step portion 214 when the holding member 300 accommodated in the first groove portion 21 moves to the second groove portion 22.

According to the terminal block 1 of the first aspect, the terminal block 1 in which the holding member 300 is attachable to and detachable from the connection surface 11 of the housing 10 can be realized.

In a terminal block 1 according to a second aspect of the present disclosure, the first groove portion 21 further includes a second narrow width portion 213 disposed farther from the connection surface 11 than the wide width portion 212 in the first direction Z, the second narrow width portion 213 being capable of accommodating the second end 312 of the holding member 300 in a state where the claw portion 330 is elastically deformed, a wall portion 216 that restricts movement of the accommodated claw portion 330 in the third direction Y is at a boundary of the wide width portion 212 and the second groove portion 22 in the third direction Y, and the holding member 300 accommodated in the first groove portion 21 is movable to the second groove portion 22 when the claw portion 330 moves from the wide width portion 212 to the second narrow width portion 213.

According to the terminal block 1 of the second aspect, the terminal block 1 in which the holding member 300 can be more reliably attached to the connection surface 11 of the housing 10 can be realized.

In a terminal block 1 according to a third aspect of the present disclosure, the housing 10 includes a pair of side surfaces 103 extending in the first direction Z and arranged side by side in the third direction Y, and the at least one attachment groove 20 is disposed such that when viewed from the first direction Z, a center line CL, which passes through a center of the pair of side surfaces 103 and extends in the second direction X, passes through a center of the first groove portion 21 in the third direction Y.

According to the terminal block 1 of the third aspect, the terminal block 1 capable of more reliably holding the electromagnetic relay 100 connected to the housing 10 by the holding member 300 can be realized.

In a terminal block 1 according to a fourth aspect of the present disclosure, the at least one attachment groove 20 includes a pair of attachment grooves 20 arranged at intervals in the second direction X.

According to the terminal block 1 of the fourth aspect, the terminal block 1 capable of more reliably holding the electromagnetic relay 100 connected to the housing 10 by the holding member 300 can be realized.

Note that by appropriately combining arbitrary embodiments or modified examples among the various embodiments or modified examples described above, the effects thereof can be achieved. In addition, combinations of embodiments, combinations of examples, or combinations of embodiments and examples are possible, and combinations of features in different embodiments or examples are also possible.

Although the present disclosure has been fully described in connection with preferred embodiments with reference to the accompanying drawings, various modifications and corrections will be apparent to those skilled in the art. Such modifications and corrections are to be understood as being included within the scope of the present disclosure as set forth in the appended claims only if such modifications and corrections are not deviated from the scope of the present disclosure.

INDUSTRIAL APPLICABILITY

A terminal block of the present disclosure can be used as, for example, a relay socket.

REFERENCE SIGNS LIST

1. terminal block
10. housing
101. upper surface
102. bottom surface
11. connection surface
12. opening
13. terminal hole
20. attachment groove
21. first groove portion
211. first narrow width portion
212. wide width portion
213. second narrow width portion
214. step portion
215. inclined portion
216. wall portion
22. second groove portion
100. electromagnetic relay
300. holding member
310. main body portion
311. first end
312. second end
320. arm portion
321. projection
330. claw portion
331. inclined portion
332. flat plate portion

The invention claimed is:

1. A terminal block, comprising a housing including a connection surface to which an electromagnetic relay is connectable and a holding member is attachable, the holding member that holds the electromagnetic relay in a state of being connected to the connection surface, including:

a main body portion having an elongated plate shape;

an arm portion at a first end of the main body portion in an extending direction, the arm portion extending in a direction intersecting a plate surface of the main body portion; and a claw portion at a second end on a side opposite to the first end of the main body portion in the extending direction, the claw portion extending in a direction away from the main body portion from the second end toward the first end and being elastically deformable in a direction approaching the main body portion, wherein the housing includes at least one attachment groove that opens to the connection surface and extends toward inside of the housing along a first direction intersecting the connection surface, the at least one attachment groove includes a first groove portion and a second groove portion respectively capable of accommodating the second end of the main body portion in a state where the main body portion extends in the first direction and the arm portion extends in a second direction intersecting the first direction and the plate surface of the main body portion so that the connected electromagnetic relay can be sandwiched together with the connection surface, the first groove portion and the second groove portion being disposed adjacent to and communicating with each other in a third direction intersecting the first direction and the second direction;

the first groove portion includes:

a first narrow width portion disposed near the connection surface in the first direction, the first narrow width portion being capable of accommodating the claw portion in an elastically deformed state;

a wide width portion disposed farther from the connection surface than the first narrow width portion in the first direction, the wide width portion being capable of accommodating the claw portion without elastically deforming; and a step portion at a boundary of the first narrow width portion and the wide width portion, the step portion coming into contact with a tip on the first end side of the claw portion accommodated in the wide width portion to be capable of restricting a movement of the holding member in a removal direction that is the first direction from the inside of the housing toward the outside of the housing, and the second groove portion is configured to be capable of accommodating the claw portion without elastically deforming and capable of releasing a restriction of the movement of the holding member in the removal direction by the step portion when the holding member accommodated in the first groove portion moves to the second groove portion.

2. The terminal block according to claim 1, wherein the first groove portion further includes a second narrow width portion disposed farther from the connection surface than the wide width portion in the first direction, the second narrow width portion being capable of accommodating the second end of the holding member in a state where the claw portion is elastically deformed, a wall portion that restricts a movement of the accommodated claw portion in the third direction is at a boundary of the wide width portion and the second groove portion in the third direction, and the holding member accommodated in the first groove portion is movable to the second groove portion when the claw portion moves from the wide width portion to the second narrow width portion.

3. The terminal block according to claim 2, wherein the housing includes a pair of side surfaces each extending in the first direction and arranged side by side in the third direction, and the at least one attachment groove is disposed such that when viewed from the first direction, a center line, which passes through a center of the pair of side surfaces and extends in the second direction, passes through a center of the first groove portion in the third direction.

4. The terminal block according to claim 3, wherein the at least one attachment groove includes a pair of attachment grooves arranged at intervals in the second direction.

5. The terminal block according to claim 2, wherein the at least one attachment groove includes a pair of attachment grooves arranged at intervals in the second direction.

6. The terminal block according to claim 1, wherein the housing includes a pair of side surfaces each extending in the first direction and arranged side by side in the third direction, and the at least one attachment groove is disposed such that when viewed from the first direction, a center line, which passes through a center of the pair of side surfaces and extends in the second direction, passes through a center of the first groove portion in the third direction.

7. The terminal block according to claim 6, wherein the at least one attachment groove includes a pair of attachment grooves arranged at intervals in the second direction.

8. The terminal block according to claim 1, wherein the at least one attachment groove includes a pair of attachment grooves arranged at intervals in the second direction.

* * * * *